(12) United States Patent
Hudson et al.

(10) Patent No.: US 6,638,541 B1
(45) Date of Patent: Oct. 28, 2003

(54) SEXUAL DESIRE AND PERFORMANCE ENHANCEMENT WITH PROTEIN-BOUND TRYPTOPHAN

(76) Inventors: Susan P. Hudson, Scitentia Inc. 275 MacPherson Ave., Suite 105, Toronto, Ontario (CA), M4V 1A4; Craig J. Hudson, Scitentia Inc. 275 MacPherson Ave., Suite 105, Toronto, Ontario (CA), M4V 1A4

( * ) Notice: Subject to any disclaimer, the term of this patent is extended or adjusted under 35 U.S.C. 154(b) by 0 days.

(21) Appl. No.: 10/289,060

(22) Filed: Nov. 7, 2002

(51) Int. Cl.[7] ................................................. A01N 65/00
(52) U.S. Cl. ....................................................... 424/725
(58) Field of Search .......................................... 424/725

(56) References Cited

U.S. PATENT DOCUMENTS 6,503,543 B1 * 1/2003 Hudson et al.

OTHER PUBLICATIONS

Manseka, Diss. Abstr. Int., B 1997, 57 (12), 7288.*

* cited by examiner

*Primary Examiner*—Michael Meller
(74) *Attorney, Agent, or Firm*—Morgan, Lewis & Bockius LLP

(57) ABSTRACT

A composition comprising, preferably, at least partially defatted meal from a plant source containing protein-bound tryptophan that, preferably, has a higher tryptophan source than said plant source and a physiologically-acceptable diluent or carrier therefor for enhancing sexual desire and performance in a mammal. The composition, preferably, includes a carbohydrate. The invention provides a method of enhancing sexual desire and performance in a mammal having a composition described above.

10 Claims, No Drawings

SEXUAL DESIRE AND PERFORMANCE ENHANCEMENT WITH PROTEIN-BOUND TRYPTOPHAN

FIELD OF THE INVENTION

This invention relates to compositions comprising natural sources of tryptophan, particularly protein-bound tryptophan from plants, processes for making said compositions; physical formulations of said compositions, and use of said compositions for enhancing sexual desire and performance in mammals.

BACKGROUND OF THE INVENTION

Tryptophan is an essential amino acid found in numerous naturally occurring plant proteins and which has a number of interesting medicinal qualities including treatment of insomnia as well as an adjunct in the treatment of a number of psychiatric disorders. After absorption, tryptophan circulates in the blood as approximately 80% bound to plasma albumin with the remaining 20% circulating as free tryptophan, and under appropriate conditions, tryptophan is transported into the brain. Once across the blood brain barrier (BBB), tryptophan becomes available for metabolism into serotonin, a neurotransmitter implicated in mood and sleep regulation (Boman, 1988). Serotonin, in turn, is metabolized to melatonin; a sleep related hormone found in the pineal gland, a small cone-like structure in the epithalamus of the brain that regulates the 24-hour circadian rhythm in humans. Ingestion of a sufficient quantity of tryptophan per se consistently results in reduced sleep latency i.e. the time from "lights out" to sleep, and an improvement in overall quality of sleep through improved sleep architecture (Boman, 1988). Tryptophan metabolism to serotonin also serves well in conditions where depleted serotonin levels exists such as anxiety disorders, depression, obsessive-compulsive some pain disorders, aggression and eating disorders.

The hypnotic effects of tryptophan are well studied and follow a fairly flat dose-response curve with a plateau at approximately 1000 mg (for review see Schneider-Helmut and Spinweber, 1986). When given alone, as little as 250 mg of tryptophan is sufficient to produce improved sleep in people with mild insomnia, or in those reporting longer-than-average sleep latency (Hartmann and Spinweber, 1976; Hartmann 1982). Dosages of 1000 mg are associated with more consistent results (Schneider-Helmut and Spinweber, 1986) but higher dosages (2,000–12,000 mg) offer little extra benefit and, indeed, the highest dosages (12,000 mg) are associated with disrupted sleep architecture despite a reduction in sleep latency (Griffiths et al 1972).

The aforesaid medical conditions have been addressed in PCT published application No. WO 01/89319, published Nov. 29, 2001, in the names of Hudson, Susan P. and Hudson, Craig J. Aforesaid WO 01/89319 describes compositions comprising at least partially defatted meal from a plant source containing protein-bound tryptophan, preferably squash seeds, and, optionally, a carbohydrate source provided in an amount capable of facilitating transport of in vivo generated tryptophan across the blood brain barrier. Also described are dietary supplements, foods and beverages comprising the composition of the invention to induce sleep, address an anxiety disorder, depression, obsessive compulsive, aggression chronic pain and eating disorder or provide tryptophan supplementation to individuals in need thereof.

It is generally accepted that medications that increase brain serotonin levels will result in reduced libido as well as reduced overall sexual function (Bradford 2001). Medications associated with reduced libido, include antidepressants, especially those in the Selective Serotonin Reuptake Inhibitor (SSRI) class, as well as the serotonin precursor, tryptophan (Young 1986).

There are previous rare reports of increased sexual desire/function in persons that have taken substantial dosages of tryptophan, i.e. in excess of 6 gm per day.

Further, previous reports suggest that essentially all persons that have reported increased sexual desire or performance while taking tryptophan were also taking concomitant medications. There are no reports of tryptophan resulting in increased sexual desire or performance in instances where tryptophan was taken alone in relatively low doses as an orphan medication.

Yet further, there are no reports of the effect of tryptophan-bound proteins in enhancing sexual desire or performance.

SUMMARY OF THE INVENTION

We have surprisingly discovered that aforesaid as defined in WO 01/89319 at least partially defatted meal compositions provide enhances sexual desire and performance in a mammal.

We have surprisingly discovered that human subjects in a selected sleep study who ingested a high protein food composition rich in protein-bound tryptophan reported an increase in sexual desire and performance. These results were from studies that provided very much lower amounts (<250 mg) of possible tryptophan per se as calculated from the tryptophan-bound protein ingested, relative to the amounts described in the aforesaid prior art (>6 gm/day).

Thus, it is an object of the present invention to provide a plant source of tryptophan for use in enhancing sexual desire and performance in mammals.

Accordingly, in one aspect the invention provides a composition comprising a meal from a plant source containing protein-bound tryptophan, and a physiologically acceptable diluent or carrier therefore for enhancing sexual desire and performance in mammals.

Most preferably, the meal is at least partially defatted.

The naturally derived, tryptophan-rich compositions developed according to aforesaid WO 01/89319 by enriching the protein-bound tryptophan content of a tryptophan-rich protein source have been found to enhance sexual desire and performance in mammals. Compositions of use in the invention comprise a plant source naturally containing protein-bound tryptophan, preferably squash seeds, such as butternut squash seeds, peppercorn squash seeds and pumpkin seeds. Preferably, the plant source is at least partially defatted to concentrate the protein-bound tryptophan content. The composition further, preferably, comprises a carbohydrate source, such as glucose, in an amount sufficient to enhance uptake of tryptophan across the blood brain barrier and to circumvent the competition for BBB transport sites into the central nervous system (CNS). The composition can further optionally comprise physiologically acceptable vehicle(s), flavorings, colors and other nutrients, such as vitamins, preferably vitamin B3 and/or vitamin B6.

In a preferred embodiment, the composition comprises at least partially defatted squash seeds, particularly butternut squash, pumpkin and peppercorn squash seeds, glucose and vitamins B3 and B6.

The invention further pertains to dietary supplements, in the form of, e.g. a tablet, powder, suspension, liquid, capsule or gel; foods, e.g., dietary bar, cookie, baked good, snack food, candy, candy bars, beverages and like edible foods comprising the composition of the invention.

It is described in aforesaid WO 01/89319 that using second derivative spectroscopy, that certain plant sources and, specifically, plant seeds possess relatively high levels of protein-bound tryptophan and that these materials can be used to provide tryptophan in vivo. A process was developed to produce edible compositions having enhanced levels of protein-bound tryptophan as a natural protein source of tryptophan richer than the known natural source. Plants that use gramine typically contain high levels of tryptophan and can be used herein as the plant source. It is desirable, but not essential, that the starting plant material contain at least 200 mg/100 g or at least 0.2% tryptophan in its protein-bound form. Tryptophan concentration can be determined using known methods, including, for example, high pressure liquid chromatography (HPLC), second derivative spectroscopy or any other known methodology. Second derivative spectroscopy is the preferred method to quantitatively analyze tryptophan levels as it eliminates background absorbence.

According to an embodiment of the invention, protein-bound tryptophan levels present in the plant material source are enhanced using a series of steps to extract oil from the plant material to render the material partially defatted. The plant source can be a seed such as, for example, but not limited to, butternut squash seed, peppercorn squash seed, pumpkin seed, lentil seed, sunflower seed, flax seed, watermelon seed, sisymbrium seed, cotton seed, sesame seed, canola seed, evening primrose seed, barley, safflower seed, alfalfa seed, soy beans and combinations thereof. Preferably, the seed is a butternut squash seed as it is believed to contain the highest ratio of tryptophan to total proteins, relative to other seed types. The plant source can also be a vegetative part of the plant, such as alfalfa, seaweed or kelp. Although it is preferred to partially defat the plant source to enhance protein-bound tryptophan levels, defatting is not essential to practice the invention.

Aforesaid WO 01/89319 describes a method for producing an enriched, natural source of tryptophan, comprising identifying a naturally occurring source of protein-bound tryptophan in a plant source; compressing the plant source under conditions sufficient to release oil contained therein; and at least partially removing the oil contained therein to yield a partially defatted plant source that has a higher tryptophan source than the starting material.

In the case of seeds, it is not necessary to remove their seed coat or hull to expose the endosperm prior to processing. The seed, preferably in one embodiment, is first processed through a series of smooth rollers to produce a thin flake in a process known as flaking. This step allows the oil cells to at least partially rupture and increases the surface area of the seeds for further treatment.

The flaked seeds are subsequently heat treated in a process known as cooking or conditioning to further rupture oil cells and increase the oil viscosity for subsequent defatting. The conditioning step can be performed using, for example, a microwave, an oven or by indirect steam. The temperature of the conditioning step should be sufficient to rupture the oil cells and increase the viscosity of the oil without detrimentally destroying proteins contained in the plant material. Preferably, the temperature is from about 40° C. to about 50° C. The conditioning step is performed for a period of time sufficient to achieve the goal temperature.

Prior to cooling, the heated seed flakes are then mechanically pressed to at least partially remove the oil contained therein. Any known mechanical press or expeller can be used, such as, for example, a Gusta Lab Press. The degree of defatting depends in part on the flaking and cooking steps performed, temperature and oil viscosity and the pressure exerted on the seed. Typically, from about two thirds to about three quarters of the oil is preferably removed.

The pressed plant material can then be further processed depending upon the end user. For example, the plant material can be milled using any conventional means, such as, but not limited to a disk mill, hammer mill or pin mill. The type of mill selected depends in part upon the consistency of the product desired. For example, a pin mill yields a product having a flour-like consistency, while the disk mill or the hammer mill yields a product with a granular consistency.

The hereinabove process yields a natural source of protein-bound tryptophan having a tryptophan content that is greater than in its parent plant source. Preferably, the material should provide at least 0.2% by weight tryptophan. The resultant, at least partially, defatted seed meal can then be incorporated into compositions useful for enhancing sexual desire and performance.

In addition to the partially defatted meal, the compositions of use in the practise of the invention further, preferably, comprise a carbohydrate source with a high glycemic index, preferably in the form of glucose, although sucrose and other sugars that breakdown into glucose can be used. Without being bound by theory, it is believed that the carbohydrate source facilitates the uptake of tryptophan per se across the blood brain barrier, where it is made available for metabolism into serotonin. In the human, a barrier exists that allows the brain functions to operate in an independent environment from the rest of the body in order to protect the sensitive nature of the CNS. This barrier is the result of countless tight junctions between the cerebral endothelial cells at the blood-brain interface that restricts diffusion into the brain (Saunders et al., 1991). Superimposed on the diffusion provided by the tight junctions is a series of transport mechanisms into and out of the brain that regulate the internal environment of the brain with respect to a wide range of molecules including electrolytes, glucose, vitamins and amino acids. The transport mechanism for tryptophan is utilized also by other large neutral amino acids (LNAA) as well (Lajtha, 1974; Betz and Goldstein, 1978). Competition for these transport sites, it is believed, is the reason that a large high protein meal fails to induce a hypnotic effect despite containing sufficient tryptophan (Moller, 1983). Conversely, in the same study, high carbohydrate meals with relatively small amounts of tryptophan did induce a mild hypnotic effect. This apparent contradiction may be explained by the shunting of competing LNAA to liver and muscle tissue at times of relatively high insulin serum levels (Fernstrom and Wurtman, 1971). Tryptophan is not shunted in this manner and consequently, any free tryptophan is afforded an insulin-induced competitive advantage of the transport sites across the BBB.

The carbohydrate source, preferably, is present in an amount sufficient to induce an increase in blood insulin levels in the individual consuming the composition. The tryptophan/LNAA ratio increases with increased insulin levels. An increase from 15 microunits/ml to 60 microunits/ml results in an approximately 35% increase in the tryptophan/LNAA ratio. This level of increase is sufficient although less significant increases will also be beneficial. Preferably, the amount of glucose present in the composition is from about 25 g to about 150 g, with 75 g being most preferred. The amount of tryptophan will remain constant but increases in the carbohydrate will increase the tryptophan/LNAA ratio. Other carbohydrate sources may include maltose, sucrose, and the like, but, preferably, not fructose, in view of its low glycemic index. For individuals that are obese or have type II diabetes, a higher amount of carbohydrate e.g., 100 g, may be required because of abnormal insulin responses to glucose.

Since, approximately 80% of tryptophan is protein bound in the blood in vivo, there is only a small pool of free tryptophan that actually competes with other LNAAs for entry into the brain. Consequently, under ordinary conditions plant protein-bound tryptophan that is ingested, is metabolized and, subsequently, quickly stored in the "albumin reservoir" and has little impact on the availability of CNS tryptophan unless given in superphysiological amounts. If, however, tryptophan becomes available at a time when insulin levels increase, free fatty acids compete for the "albumin reservoir" and convert existing protein-bound to free tryptophan, as well as preventing the incorporation of the newly ingested tryptophan. Thus, whilst the serum levels of competing LNAAs are reduced, two separate sources of tryptophan, i.e. existing protein-bound and new ingested tryptophan result in increased free tryptophan. In view of this, it is desirable to provide a product that contains at least some residual oil content to preserve a portion of the fatty acids present in the plant material or seed. For squash seeds, about 20% residual oil remaining in the seed meal is optimal. For other seeds, it may be necessary to add. other fatty acids back into the partially defatted product to provide the optimal balance of fatty acids. Hydrogenated oils or other oils, such as canola oil, sunflower oil, safflower oil, palm kernel oil, corn oil or milk solids can be added for this purpose.

In a preferred embodiment, the composition of use in the practise of the invention comprises at least partially defatted squash seeds, particularly butternut squash seeds, pumpkin seeds, peppercorn seeds and combinations thereof, glucose in an amount sufficient to facilitate uptake of the tryptophan provided from the squash seeds across the blood brain barrier in the individual consuming the composition, and vitamins B3 and B6 in amounts present to facilitate tryptophan uptake.

In another embodiment, the composition comprises at least partially defatted butternut squash seed meal, e.g., from about 50 g to about 100 g, in an amount sufficient to provide about 250 mg to about 1000 mg tryptophan, and from about 25 g to about 200 g glucose. More particularly preferred is a composition comprising from about 25 g to about 50 g defatted butternut squash seed meal pressed to reduce the oil content by 75% and from about 75 g to about 100 g glucose. Optionally, the composition comprises vitamin B3 and/or vitamin B6. Vitamin B3 can be present in amounts of from about 5 mg to about 50 mg; and vitamin B6 in amounts of from about 0.5 mg to about 50 mg, with 50 mg of each of vitamins B3 and B6 being preferred.

The composition and dietary supplements of the invention are intended to be orally administered daily. The compositions are formulated for the intended use, preferably, as a single daily administration prior to bedtime. Alternatively, the compositions may be formulated in multiple portions for more or less frequent administration as desired. For reasons of size to facilitate ease of swallowing or improved bioabsorption or utilization before sleep or at any desired time, a given dosage may be divided into two, three, or more tablets or capsules, and the like. A daily dosage may be administered as one tablet, as two tablets taken together. The recommended amounts of each ingredient, as described above, serve as a guideline for formulating the supplements of this invention. The actual amount of each ingredient per unit dosage will depend upon the number of units administered to the individual desiring need thereof. This is a matter of product design and is well within the skill of the dietary supplement formulator.

The compositions of use in the present invention may be formulated using any pharmaceutically acceptable forms of the vitamins, minerals and other nutrients discussed above, including their salts. They may be formulated into capsules, tablets, powders, suspensions, gels or liquids optionally comprising a physiologically acceptable carrier, such as but not limited to water, milk, juice, starch, vegetable oils, salt solutions, hydroxymethyl cellulose, carbohydrate. The compositions may be formulated as powders, for example, for mixing with consumable liquids, such as milk, juice, water or consumable gels or syrups for mixing into dietary liquids or foods. The compositions of use this invention may be formulated with other foods or liquids to provide premeasured supplemental foods, such as single servings bars, for example.

The compositions can be made in a variety of forms, such as baked goods, e.g., cookies, brownies, fudge, cake, breads, biscuits, crackers, puddings, confections, i.e., candy, snack foods e.g., pretzels, chips, dietary beverages, ice cream, frozen confections and novelties, or non-baked, extruded food products such as bars. The preferred form is a non-baked extruded nutritional bar.

The compositions can also contain other ingredients such as one or a combination of other vitamins, minerals, antioxidants, fiber and dietary supplements. Selection of one or several of these ingredients is a matter of formulation design, consumer and end-user preference. The amount of these ingredients added to the compositions of use this invention are readily known to the skilled artisan and guidance to such amounts can be provided by the U.S. RDA doses for adults. Vitamins and minerals that can be added include, but are not limited to, calcium phosphate or acetate, tribasic; potassium phosphate, dibasic; magnesium sulfate or oxide; salt (sodium chloride); potassium chloride or acetate; ascorbic acid; ferric orthophosphate; niacin amide; zinc sulfate or oxide; calcium pantothenate; copper gluconate; riboflavin; beta-carotene; pyridoxine hydrochloride; thiamin mononitrate; folic acid; biotin; chromium chloride or picolonate; potassium iodide; sodium selenate; sodium molybdate; phylloquinone; Vitamin $D_3$; cyanocobalamin; sodium selenite; copper sulfate; Vitamin A; Vitamin E; vitamin $B_6$ and hydrochloride thereof; Vitamin C; inositol; Vitamin $B_{12}$; potassium iodide.

Flavors, coloring agents, spices, nuts and the like can be incorporated into the product. Flavorings can be in the form of flavored extracts, volatile oils, chocolate flavorings, peanut butter flavoring, cookie crumbs, crisp rice, vanilla or any commercially available flavoring. Examples of useful flavorings include but are not limited to pure anise extract, imitation banana extract, imitation cherry extract, chocolate extract, pure lemon extract, pure orange extract, pure peppermint extract, imitation pineapple extract, imitation rum extract, imitation strawberry extract, or pure vanilla extract; or volatile oils, such as balm oil, bay oil, bergamot oil, cedarwood oil, cherry oil, walnut oil, cinnamon oil, clove oil, or peppermint oil; peanut butter, chocolate flavoring, vanilla cookie crumb, butterscotch or toffee. In a preferred embodiment, the dietary supplement contains non-caffeinated cocoa or chocolate, or chocolate substitutes, such as carob. The food compositions may further be coated, for example with a yogurt coating.

Emulsifiers may be added for stability of the final product. Examples of suitable emulsifiers include, but are not limited to, lecithin (e.g., from egg or soy), and/or mono- and di-glycerides. Other emulsifiers are readily apparent to the skilled artisan and selection of suitable emulsifier(s) will depend, in part, upon the formulation and final product.

Preservatives may also be added to the compositions to extend product shelf life. Preferably, preservatives such as potassium sorbate, sodium sorbate, potassium benzoate, sodium benzoate or calcium disodium EDTA are used.

In addition to the carbohydrates described above, the compositions can contain artificial sweeteners, e.g., saccharides, cyclamates, aspartamine, aspartame, acesulfame K, and/or sorbitol. Such artificial sweeteners can be desirable if the dietary supplement is intended for an overweight or obese individual, or an individual with type II diabetes who is prone to hyperglycemia.

To manufacture such a food bar, the liquid ingredients are cooked; the dry ingredients are added with the liquid ingredients in a mixer and mixed until the dough phase is reached; the dough is put into an extruder and extruded; the extruded dough is cut into appropriate lengths; and the product is cooled. For manufacture of other foods or beverages, the ingredients comprising the compositions of use in the practise of this invention can be added to traditional formulations or they can be used to replace traditional ingredients. Those skilled in food formulating will be able to design appropriate foods/beverages with the objective of this invention in mind.

It is noted that there are potential side effects with tryptophan supplementation. Tryptophan at lower dosages have few side effects but there are reports of difficulties at higher dosages or in combination with certain antidepressants. When combined with a monoamine oxidase inhibitor (MAOI), tryptophan carries a risk of delirium and neurological dysfunction (Thomas and Rubin, 1984). At higher dosages (greater than 12 gm per day) the most frequent complaints are daytime sedation and nausea (Hartmann, 1977). There are a few theoretical risks that have been demonstrated in animal models but not in humans. Large dosages of 1-tryptophan produce lipogenesis in animals (Fears and Murrell, 1980) but this effect was not seen in humans (Sourkes, 1983). Similarly there is a theoretical risk that a tryptophan metabolite, xanthurenic acid may lead to the development of diabetes (Kotake and Murakami, 1971). Thus, it is an objective of the present invention to limit the daily amount of protein-bound tryptophan administered to an individual to levels below about 12 gm tryptophan a.i. per day to avoid these potential side effects. In yet a further aspect, the invention provides a process for the manufacture of a pharmaceutical composition when used for enhancing sexual desire and performance in a human said process comprising admixing a composition as hereinbefore defined with a physiologically acceptable carrier therefore.

In a further aspect, the invention provides a method of enhancing sexual desire and performance in a mammal by administering to said mammal an effective amount of a composition as hereinabove defined.

DETAILED DESCRIPTION OF PREFERRED EMBODIMENTS

EXAMPLES

The procedures for obtaining compositions of use in the practise of the present invention are as described in aforesaid WO 01/89319.

A food bar (50 gm) for use according to the invention was made according to the general procedures described in aforesaid WO 01/89319, having the composition 26.3 gm of defatted squash seed 17.2 gm glucose ("glucose 43")

5.0 gm Caramel (New World Flavours)

1.5 gm dried apple pieces 20.0 mg vitamin B3

20.0 mg vitamin B6

Patient Reports

Three human subjects reported increased sexual desire/performance voluntarily with no direct inquiry by the researcher with respect to changes in libido. Each subject ingested their food bar approximately 1 hour prior to retiring to bed for the evening. Two subjects reported increased sexual desire of a persistent nature, while another subject reported increased desire with enhanced quality of sexual experience.

Although this disclosure has described and illustrated certain preferred embodiments of the invention, it is to be understood that the invention is not restricted to those particular embodiments. Rather, the invention includes all embodiments which are functional or mechanical equivalence of the specific embodiments and features that have been described and illustrated.

What is claimed is:

1. A method of increasing the sexual desire and performance in a mammal comprising administering to said mammal a therapeutically effective amount of defatted butternut squash seed which has a higher tryptophan content than butternut squash seed before defatting and a physiologically-acceptable diluent or carrier, wherein the sexual desire and performance of the mammal is increased.

2. A method as defined in claim 1 further comprising a carbohydrate source having a high glycemic index.

3. A method as defined in claim 2 wherein the carbohydrate source is selected from the group consisting of glucose, maltose, sucrose and combinations thereof.

4. A method as defined in claim 1 wherein said composition further comprises a vitamin selected from the group consisting of vitamin B3, B6 and combinations thereof in an amount sufficient to enhance uptake of the tryptophan across the blood/brain barrier.

5. A method as defined in claim 1 wherein said defatted butternut squash seed is in the form of a tablet, powder, suspension, liquid, capsule or gel.

6. A method as defined in claim 1 wherein said defatted butternut squash seed is in the form of a dietary supplement.

7. The method as defined in claim 6 wherein said dietary supplement is provided as a bar.

8. A method as defined in claim 2 wherein said composition comprises at least partially defatted butternut squash seed meal having protein-bound tryptophan in an amount of about 25 mg to about 1000 mg tryptophan, from about 25 mg to about 200 mg of glucose and a physiologically acceptable diluent or carrier therefor.

9. A method as defined in claim 2 wherein said composition comprises at least partially defatted butternut squash seed meal providing from about 25 mg to about 50 mg tryptophan, from about 75 mg to about 100 mg of glucose and a physiologically acceptable diluent or carrier therefor.

10. A method as defined in claim 1 wherein said composition further comprises from about 5 mg to about 50 mg vitamin B3; from about 0.5 mg to about 50 mg vitamin B6, and combinations thereof.

\* \* \* \* \*